United States Patent
Beruto et al.

(10) Patent No.: US 12,368,670 B2
(45) Date of Patent: Jul. 22, 2025

(54) LOCALLY UNIQUE MAC ADDRESS RESOLUTION

(71) Applicant: SEMICONDUCTOR COMPONENTS INDUSTRIES, LLC, Scottsdale, AZ (US)

(72) Inventors: Piergiorgio Beruto, Genoa (IT); Kyle Storey, Orem, UT (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 302 days.

(21) Appl. No.: 18/177,043

(22) Filed: Mar. 1, 2023

(65) Prior Publication Data

US 2024/0297848 A1    Sep. 5, 2024

(51) Int. Cl.
| | | |
|---|---|---|
| *H04L 45/74* | (2022.01) | |
| *H04L 47/56* | (2022.01) | |
| *H04L 61/2596* | (2022.01) | |
| *H04L 101/622* | (2022.01) | |

(52) U.S. Cl.
CPC ............ *H04L 45/74* (2013.01); *H04L 47/562* (2013.01); *H04L 61/2596* (2013.01); *H04L 2101/622* (2022.05)

(58) Field of Classification Search
None
See application file for complete search history.

(56) References Cited

U.S. PATENT DOCUMENTS

| | | |
|---|---|---|
| 10,925,097 B2 | 2/2021 | Beruto et al. |
| 11,184,319 B2 | 11/2021 | Hu et al. |
| 2003/0179750 A1 | 9/2003 | Hasty et al. |
| 2013/0013810 A1 | 1/2013 | Allan et al. |
| 2015/0016461 A1 | 1/2015 | Qiang |
| 2015/0381565 A1* | 12/2015 | Thaler ................ H04L 61/5046 370/389 |
| 2022/0224671 A1 | 7/2022 | De La Oliva et al. |
| 2023/0135690 A1 | 5/2023 | Beruto |

FOREIGN PATENT DOCUMENTS

KR    20070121006 A    12/2007

OTHER PUBLICATIONS

"Ethernet frame," Wikipedia, 7 pages, as printed on Jan. 22, 2023.
"MAC address," Wikipedia, 9 pages, as printed on Jan. 22, 2023.
(Continued)

*Primary Examiner* — Robert M Morlan
(74) *Attorney, Agent, or Firm* — Ramey LLP

(57) ABSTRACT

A network interface controller may include a transceiver coupled to a transmit buffer to send messages via a communications medium and coupled to a receive buffer to store messages received via the communications medium, each of said messages including a source field containing a media access control (MAC) address. A network node may include a network interface controller coupled to the transceiver to implement a network communications protocol for conveying the messages via the communications medium, the network interface controller being configured to dynamically determine a locally unique MAC address for the network interface.

17 Claims, 2 Drawing Sheets

(56) References Cited

OTHER PUBLICATIONS

Extended European Search Report for counterpart application No. 23214482.4, mailed Apr. 16, 2024, 9 pages.
Antonio De La Oliva Robert Gazda Any Other: "Proposal for IEEE 802. ICQ (Self-Assignment part)", IEEE Draft; CQ-AOLIVA-PROPOSAL-SELFASIGNMENTTEXT-0318, IEEE-SA, Piscataway, NJ USA, vol. 802.1 Mar. 5, 2018 (Mar. 5, 2018), pp. 1-10, XP068124122, Retrieved from the Internet: URL: grouper.ieee.org/groups/802/1/files/public/docs2018/cq-aoliva-proposal-selfasignment-text-0318.pdf, [retrieved on Mar. 5, 2018].

* cited by examiner

LOCALLY UNIQUE MAC ADDRESS RESOLUTION

TECHNICAL FIELD

The present disclosure relates to media access control for networks, and more particularly to devices and methods for ensuring dynamically assigned media access control networks are locally unique.

BACKGROUND

In many wired and wireless networking protocols, each device or network interface is assigned a Media Access Control (MAC) address, which can serve as a source indicator and/or as a destination indicator for messages sent over the network medium (e.g., wire, optical fiber, radiofrequency signaling). In many cases, the protocol specifies that the MAC address should be unique to ensure that messages arrive at their intended destinations.

This uniqueness can be achieved by assigning each device a globally unique MAC address that is embedded in the device's nonvolatile memory. The Institute of Electrical and Electronics Engineers (IEEE) operates a registry through which manufacturers can obtain allocated Organizationally Unique Identifiers (OUI) to serve as a portion of the MAC addresses for their devices. The manufacturers can then determine the remaining portion of their devices' MAC addresses in whatever fashion they choose to provide global uniqueness.

The Ethernet family of standards (IEEE 802.3) has become popular and has been adopted into many industrial and automotive applications in which hundreds or even thousands of nodes may be wired into a shared network. Between the automotive industry, which sells tens of millions of vehicles each year, and the evermore pervasive Internet of Things (IoT), manufacturers of sensors and other electronic devices face the very real possibility of exhausting their supply of unallocated MAC addresses. More can be obtained by those willing to secure additional OUIs, but the associated costs are not insignificant. An alternative uniqueness solution is sought.

SUMMARY

Accordingly, there are disclosed herein methods and network interfaces to provide network nodes with locally unique MAC addresses. One illustrative network interface includes: a transceiver coupled to a transmit buffer to send transmit messages via a communications medium and coupled to a receive buffer to store receive messages obtained via the communications medium, each of said messages including a source field containing a media access control (MAC) address; and a network interface controller coupled to the transceiver to implement a network communications protocol for conveying messages via the communications medium, the network interface controller being configured to dynamically determine a locally unique MAC address for the network interface.

An illustrative network interface method includes: using a transceiver to send messages via a communications medium and to store messages received via the communications medium, each of said messages including a source field containing a media access control (MAC) address; and dynamically determining a locally unique MAC address to be used in the source field of the messages. An illustrative network node includes a network interface coupled to a host device, the network interface being configured to: broadcast a local claim message to all other nodes on a communication medium, the local claim message specifying a MAC address selected by the network interface; compare a transmit time of the local claim message to a transmit time of any remote claim message specifying the MAC address that is received before a predetermined interval has elapsed; and respond to any remote claim message specifying the MAC address that is received after the predetermined interval has elapsed by broadcasting an assert message specifying the MAC address.

Each of the foregoing network interface and method can be used in combination with one or more of the following optional features in any suitable combination: 1. dynamically determining the locally unique MAC address includes generating a tentative MAC address and broadcasting a claim message for that tentative MAC address via the communications medium, the claim message having an associated transmit time. 2. the tentative MAC address is determined using a random or pseudorandom value. 3. dynamically determining the locally unique MAC address includes initiating a timing window upon broadcasting the claim message. 4. dynamically determining the locally unique MAC address includes adopting the tentative MAC address as the locally unique MAC address if the timing window lapses successfully. 5. the network interface controller is configured to respond to any conflicting claim messages received after the timing window lapses successfully with an assertion message that indicates priority to the tentative MAC address in the conflicting claim message. 6. repeating said generating, broadcasting, and initiating, if during the timing window a conflicting claim message is received with a receive time that precedes said transmit time. 7. repeating said generating, broadcasting, and initiating when a conflicting assertion claim message is received. 8. the network communications protocol restricts usage of the communications medium to at most one sender at a time. 9. the network communications protocol is Time-Triggered Ethernet. 10. the network interface employs a physical layer interface compliant with at least one standard within the IEEE Std 802.3, 802.11, and 802.15 families. 11. at least some of the messages are unicast messages containing the locally unique MAC address in a destination field. 12. if the transmit time of the local claim message is later than the transmit time of the remote claim message, the network interface broadcasts another local claim message specifying another MAC address. 13. the network interface is further configured to respond to any remote assert message specifying the MAC address by broadcasting another local claim message specifying another MAC address.

DETAILED DESCRIPTION

It should be understood that the following description and accompanying drawings are provided for explanatory purposes, not to limit the disclosure. In other words, they provide the foundation for one of ordinary skill in the art to recognize and understand all modifications, equivalents, and alternatives falling within the scope of the claims.

Figure 1A:
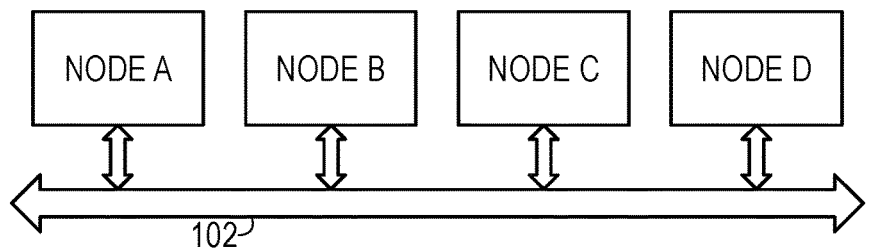
FIG. 1A shows an illustrative network.

FIG. 1A shows an illustrative network having multiple network nodes (Node A through Node D) interconnected by a communications medium 102 such as an electrical bus or cabling, optical fiber, or radiofrequency signaling. Examples of network nodes include computers, network routers, network switches, network bridges, network storage, network-attached sensors, controllers, and IoT appliances. They include one or more network interfaces coupled to host devices such as processors, microcontrollers, or application specific integrated circuitry. The network nodes may employ a physical layer interface and communications protocol compliant with one of the IEEE 802 (network) standards such as IEEE 802.3 (Ethernet), 802.11 (wireless local area network), or 802.15 (wireless personal area network). Though these are the network types used herein to illustrate the disclosed address resolution methods and interfaces, the disclosures provided herein are readily applicable to other communications media, network interfaces, and communications protocols employing network messages that provide messages with source addresses and/or destination addresses.

The illustrated communications medium 102 may carry network packets from one of the nodes to the remaining nodes. In certain preferred implementations, the communications medium 102 supports only one sender at a time, thereby ensuring that the sequence of packets conveyed by the communications medium 102 is arranged in an ordered sequence. Multiple senders attempting to operate simultaneously may create network collisions that prevent reception of either packet or that are resolved in accordance with the standard for the relevant network protocol. Examples of single-sender implementations include carrier-sense multiple access with collision detection (CSMA/CD), PHY-level collision avoidance (PLCA), and Time-triggered Ethernet (TTE).

Figure 1B:
FIG. 1B shows an illustrative network packet.

For the above network standards, each network packet includes a data frame having a preamble 110, header 112, payload 114, checksum 116, and an inter packet gap spacer 118 as shown in FIG. 1B. The header 112 may include a start delimiter 120, a destination field 122 having the MAC address of the packet's desired destination, a source field 124 having the MAC address of the packet's source node, and other fields 126 for such information as optional tags, packet type, and payload length. In some implementations, the header 112 further includes a field specifying a message type, e.g., a message tentatively claiming a MAC address, or a message asserting ownership of a MAC address. Alternatively, the packet type information may be provided as part of the payload. When the destination field 122 specifies the MAC address of a given node, the packet is a unicast message. For broadcast messages, the network protocol (including the standard protocols identified above) may provide a reserved MAC address to be used in the destination field 122 to indicate that the packet is directed to all the nodes on the communications medium 102.

Figure 2:
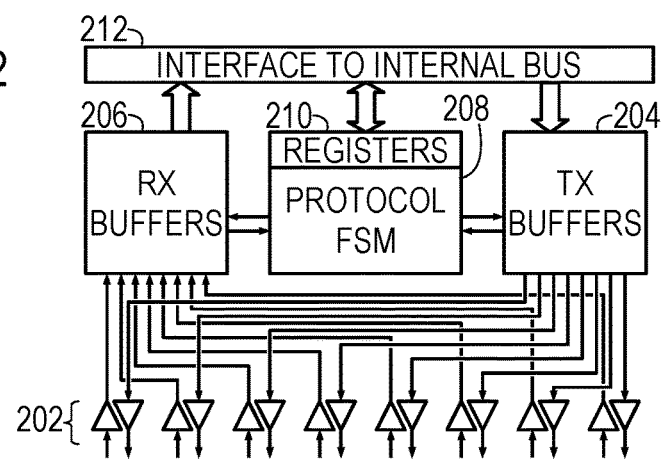
FIG. 2 is a block diagram of an illustrative network interface.

To communicate via the communications medium 102, each of Nodes A-D includes a network interface such as the illustrative network interface shown in FIG. 2. The illustrative network interface includes transceivers 202 that support multiple lanes of data stream transmission or reception. The transceivers 202 operate under control of a network interface controller 208 to send transmit messages from the transmit buffers 204 when the implemented network protocol permits and to store receive messages in the receive buffers 206 when the protocol dictates, e.g., when the message is a broadcast message or a unicast message having the MAC address of the network interface in the destination field. The network interface controller 208 may take the form of an application specific integrated circuit (ASIC) to implement the appropriate finite state machine (FSM) for the relevant network protocol, or a programmable processor executing firmware from a nonvolatile memory. In either case, a set of configuration registers 210 may provide a memory-mapped interface for use by the host device. The host device may access the configuration registers 210 via an internal bus interface 212, setting parameters values and monitoring status registers to coordinate communications over the network. Outgoing messages may be written to the transmit buffers 204 via the internal bus interface 212 using direct memory access techniques, and the incoming messages may be similarly retrieved from the receive buffers 206.

Figure 3:
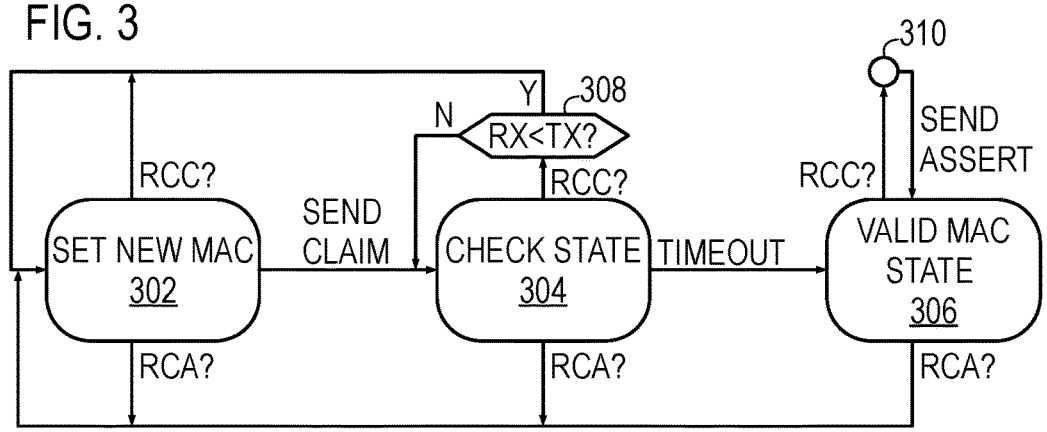
FIG. 3 is a state diagram for an illustrative MAC address resolution method.

FIG. 3 is a state diagram for an illustrative method to dynamically determine a locally unique MAC address for the network interface. The determination is "dynamic" because the address is determined when needed rather than being preset, and the resulting address is locally unique because it is unshared by the other nodes connected to the communications medium 102. This state diagram may be implemented by the network interface controller 208, optionally as part of a standard finite state machine for implementing the chosen network communications protocol. Preferably, each network node implements the illustrative MAC address resolution method, but as discussed further below this method can be implemented in a fashion that provides backwards compatibility with standards-compliant nodes that do not implement this method.

The state diagram has an initial state 302. When the network interface controller 208 is powered on or otherwise enters the initial state 302, it selects a new tentative MAC address. This selection may be performed using a random or pseudorandom number generator, e.g., a module that obtains one or more seed values from a clock, sensor measurement, unique identifier such as a die-level traceability (DLT) code, and/or other sources, and derives a series of one or more unpredictable values therefrom. The derived value may be optionally combined with a OUI to avoid any address collisions with addresses allocated to other manufacturers. Note that the MAC address format specified by the EUI-48 numbering standard includes a reserved bit to indicate whether the MAC address is a globally unique address or whether it is determined locally. This reserved bit could be set rather than relying on an OUI to avoid conflicts with allocated addresses.

The network interface controller 208 exits the initial state 302 and enters the check state 304 by sending a claim message to the other nodes on the communications medium 102. (Because this claim message sent by the controller 208 is generated locally, it may be referred to hereinafter as a "local" claim message as opposed to those claim messages received by the controller 208 from other nodes, which may be referred to herein as "remote" claim messages. Similarly, a "local" assert message and a "remote" assert message respectively correspond to an assert message sent by the controller 208 to another node and an assert message received by controller 208 from another node.)

Claim messages are not currently a part of any standard network communications protocol; they may employ a standard broadcast data frame or packet format, but will include a field or value identifying the message as a claim message. The claim message may, but need not, employ the tentative MAC address as a source identifier, thereby indicating the MAC address it is attempting to claim. If it does not employ the MAC address as a source identifier, the claim message will elsewhere specify the tentative MAC address.

Upon sending the local claim message, the network interface controller 208 initiates a timing window. The timing window is set so as to give each other node an opportunity to respond to the claim message. Where the communications medium 102 supports a total of N nodes and provides time division multiplexed (TDM) slots each having a duration of Ts, the timing window may for example be set to 2•N•Ts, giving each node at least two opportunities to respond. In most cases, it is expected that the timing window will elapse successfully, i.e., without a conflicting claim message or a conflicting assert message being received. A remote claim message is conflicting if it specifies a tentative MAC address that matches the current node's tentative MAC address or (in state 306) validated MAC address. Similarly a remote assert message is conflicting if it indicates a validated MAC address that matches the current node's tentative or validated MAC address. Absent any such conflicting messages, the timing window elapses successfully and the network interface controller 208 enters the validated state 306.

In validated state 306, the network interface controller 208 adopts the tentative MAC address as a validated MAC address that has been determined to be locally unique. Thereafter, the network interface controller 208 promptly responds to any conflicting claim messages by sending an assert message. State 310 is a temporary transition state that persists only until the local assert message is sent, after which the network interface controller 208 returns to validated state 306.

Like the claim messages, the assert message may be a special purpose assert message that is not currently part of any standard network communications protocol; it may employ a standard broadcast data frame or packet format, but would include a field or value identifying the message as an assert message. Because the MAC address has been validated, the assert message preferably employs the validated MAC address as a source identifier.

We note, however, that it may be unnecessary to employ a special purpose assert message. Any response to the conflicting claim message that employs the validated MAC address as a source identifier would function as an assert message. This characteristic may advantageously facilitate backwards compatibility with nodes that do not implement the disclosed address resolution method. Regardless of which state 302, 304, 306 the network interface controller 208 is currently in, the reception of a conflicting assert (RCA) message causes the network interface controller 208 to re-enter initial state 302 and repeat the process starting with selection of a new tentative MAC address.

Reception of a conflicting claim (RCC) message while the network interface controller 208 is in the initial state 302 similarly causes the process to restart with selection of a new tentative MAC address. Reception of a conflicting claim message while the network interface controller 208 is in check state 304 leads to a test state 308 where the network interface controller 208 determines whether the conflicting claim message was received before or after the local claim message was transmitted (as represented by the transition from state 302 to 304). Where, as indicated previously, the network communications protocol provides for only one sender at a time on communications medium 102, the messages were necessarily sent in an ordered sequence that can be readily determined. If the local claim message was transmitted first, the network interface controller 208 returns to the check state 304, optionally re-initializing the window timer. On the other hand, if the conflicting claim message was transmitted first, the network interface controller 208 restarts the process beginning with initial state 302.

The determination of relative timing can be implemented in various ways. One approach is to track the time at which the local claim message is transmitted and compare that transmit time to the time at which the conflicting claim message is received. A perhaps easier approach is to set a flag when the local claim message is placed in the transmit buffer 204 and queued for transmission, and to have the flag be reset when transmission of the local claim message is complete. When a conflicting claim message is received, the network interface controller 208 may check the flag to determine whether transmission of the local claim message is still pending or whether it has already been completed.

Figure 4:
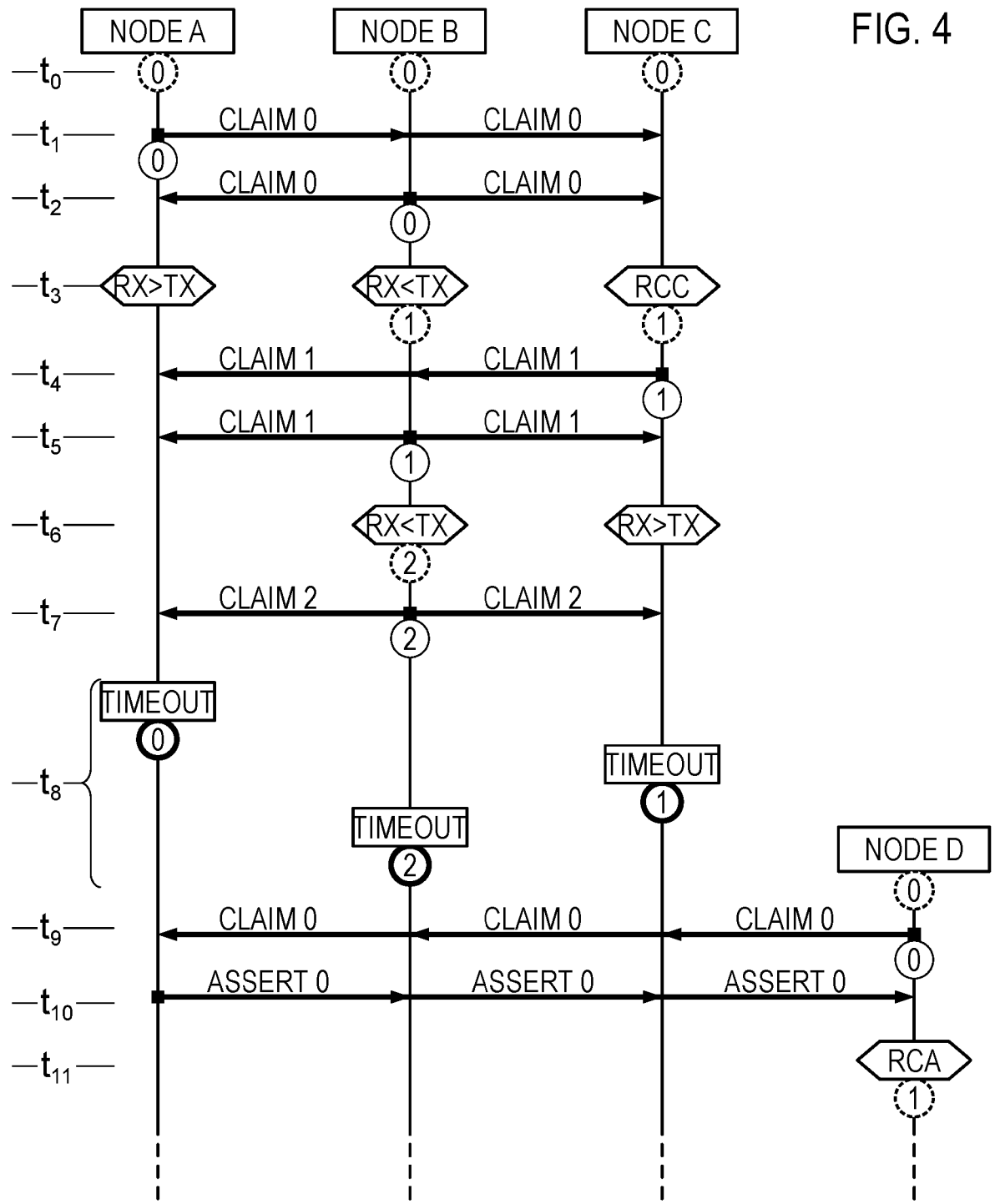
FIG. 4 is a timeline of events that further illustrate the illustrative method.

To further illustrate the principles behind the disclosed method, FIG. 4 is a timeline of events that may be experienced by four network nodes. At time t0, Nodes A, B, and C are initialized and select a tentative MAC address. (Node D is assumed to be added to the network later in the process). The selected addresses are preferably random, but for the purposes of illustration FIG. 4 shows a worst case situation in which each of the nodes initially chooses the same tentative MAC address, in this case, "0". The broken outline around the selected address indicates that each of the nodes is in the initial state. An unbroken line around the selected address will indicate the check state, and a heavy line around the address will indicate the validated state.

At time t1, Node A broadcasts a claim message to the other nodes, claiming "0" as its tentative MAC address and entering the check state. Due to a hypothetical queuing delay, Node B subsequently broadcasts a conflicting claim message for address "0" as its tentative MAC address and entering the check state at time t2. At time t3, each of the nodes processes the received messages. Node A, being in the check state and having received a conflicting claim message, evaluates the relative timing of the messages and determines that the conflicting claim message was received after the local claim message was sent. Node A accordingly remains in the check state. Node B, also being in the check state and having received a conflicting claim message, evaluates the relative timing but finds that the conflicting claim message was received before the local claim message was sent. Node B accordingly returns to the initial state, selecting a different tentative MAC address. As before, this selection is preferably random, but is shown here as being "1" for the purposes of illustration. Node C, being in the initial state and having received a conflicting claim message, re-enters the initial state and selects a new tentative MAC address, shown here as "1" for the purposes of illustration.

At time t4, Node C broadcasts a claim message to the other nodes, claiming "1" as its tentative MAC address and entering the check state. Due to the queuing delay, Node B subsequently broadcasts a conflicting claim message for address "1" as its tentative MAC address and enters the check state. At time t6, each of the nodes processes the received messages. As Node A's tentative address is "0", the received claim messages for address "1" do not conflict with Node A's tentative address. Node B, being in the check state and having received a conflicting claim message for its tentative address, evaluates the relative timing and finds that the conflicting claim message was received before the local claim message was sent. Node B accordingly returns to the initial state, selecting a different tentative MAC address, which is shown here as "2". Node C, being in the check state and having received a conflicting claim message for its tentative address, evaluates the relative timing and determines that the conflicting claim message was received after the local claim message was sent. Node C accordingly remains in the check state.

At time t7, Node B sends a claim message to tentative MAC address "2". This does not present any conflicts with the tentative addresses currently selected by the other nodes.

As the various window timers elapse (shown as a time range t8), the nodes transition from the check state to the validated state, adopting their respective tentative MAC addresses as valid MAC addresses.

At time t9, Node D is added to the network, entering the initial state with a tentative MAC address of "0" (just to present a worst-case example). It broadcasts a claim message to the tentative address "0" and enters the check state. Node A responds to the conflicting claim message at time t10 by broadcasting an assert message indicating prior ownership of address "0". At time t11, Node D, having received a conflicting assert message, returns to the initial state and selects a different tentative MAC address. The process continues until the tentative MAC address selected by Node D presents no address conflicts to the other nodes.

If the tentative MAC address selection is made suitably random, the chances of conflict are extremely low and the address resolution process completes very quickly. The physical layer's serialization of messages on the network medium enables the selected MAC addresses to be guaranteed as locally unique.

Upon reviewing the above disclosure, those of ordinary skill in the art will recognize various modifications, equivalents, and alternatives as being within the scope of the disclosure. It is intended that the following claims be interpreted to embrace all such modifications, equivalents, and alternatives where applicable.

What is claimed is:

1. A network interface that comprises:
   a transceiver coupled to a transmit buffer to send transmit messages via a communications medium and coupled to a receive buffer to store receive messages received via the communications medium, each of said transmit messages including a source field containing a media access control (MAC) address; and
   a network interface controller coupled to the transceiver to implement a network communications protocol for conveying the transmit messages and receive messages via the communications medium, the network interface controller being configured to dynamically determine a locally unique MAC address for the network interface by:
   generating a tentative MAC address;
   broadcasting a claim message for the tentative MAC address via the communications medium, the claim message having an associated transmit time;
   initiating a timing window upon broadcasting the claim message; and
   repeating said determining the tentative MAC address, said broadcasting the claim message, and said initiating the timing window, if during the timing window a conflicting claim message is received with a receive time that precedes said transmit time.

2. The network interface of claim 1, wherein the network interface controller determines the tentative MAC address using a random or pseudorandom value.

3. The network interface of claim 1, wherein the network interface controller is configured to adopt the tentative MAC address as the locally unique MAC address if the timing window lapses successfully.

4. The network interface of claim 3, wherein after the timing window lapses successfully, the network interface controller responds to any conflicting claim messages with an assertion message that indicates priority to the tentative MAC address in the conflicting claim message.

5. The network interface of claim 3, wherein the network interface controller is configured to unconditionally repeat said determining the tentative MAC address, said broadcasting the claim message, and said initiating the timing window when a conflicting assertion claim message is received.

6. The network interface of claim 1, wherein the network communications protocol restricts usage of the communications medium to at most one sender at a time.

7. The network interface of claim 6, wherein the network communications protocol is Time-Triggered Ethernet.

8. The network interface of claim 6, wherein the network communications protocol includes physical layer collision avoidance (PLCA).

9. The network interface of claim 1, wherein the network interface employs a physical layer interface compliant with at least one standard within the IEEE Std 802.3, 802.11, and 802.15 families.

10. A network interface method that comprises:
    using a transceiver to send transmit messages via a communications medium and to store receive messages received via the communications medium, each of said transmit messages including a source field containing a media access control (MAC) address; and
    dynamically determining a locally unique MAC address to be used in the source field of the transmit messages by:
    generating a tentative MAC address;
    broadcasting a claim message for the tentative MAC address via the communications medium, the claim message having an associated transmit time;
    initiating a timing window upon broadcasting the claim message; and
    repeating said generating the tentative MAC address, said broadcasting the claim message, and said initiating the timing window, if during the timing window a conflicting claim message is received with a receive time that precedes said transmit time.

11. The network interface method of claim 10, wherein at least some of the receive messages are unicast messages containing the locally unique MAC address in a destination field.

12. The network interface method of claim 10, wherein the tentative MAC address is generated using a random or pseudorandom value.

13. The network interface method of claim 10, wherein said dynamically determining further comprises:
    adopting the tentative MAC address as the locally unique MAC address if the timing window lapses successfully.

14. The network interface method of claim 13, wherein after the timing window lapses successfully, the method further comprises responding to any conflicting claim messages with an assertion message that indicates priority to the tentative MAC address in the conflicting claim message.

15. The network interface method of claim 13, further comprising unconditionally repeating said generating, broadcasting, and initiating when a conflicting assertion claim message is received.

16. The network interface method of claim 10, wherein said using a transceiver is performed in accordance with the Time-Triggered Ethernet standard.

17. The network interface method of claim 10, wherein said communications medium provides physical layer collision avoidance (PLCA).

\* \* \* \* \*